Jan. 30, 1962    J. L. R. SAINT-PAUL    3,018,814
TIRE MANUFACTURE
Filed July 1, 1958

United States Patent Office

3,018,814
Patented Jan. 30, 1962

3,018,814
TIRE MANUFACTURE
Jean Louis Robert Saint-Paul, Paris, France, assignor to Société anonyme dite: Pneumatiques et Caoutchouc Manufacture Kleber-Colombes, Colombes (Seine), France, a corporation of France
Filed July 1, 1958, Ser. No. 745,868
Claims priority, application France July 2, 1957
14 Claims. (Cl. 152—361)

This invention relates to the construction of pneumatic tires and more especially to the protective ply assembly in the top or tire-tread area of the tire.

It is known to provide beneath the tire tread of a tire casing a laminated assembly of rubberized fabric plies substantially equal in width to the width of the tire tread. Such an assembly performs various useful functions in the tire. These functions include: protecting the tire casing against impacts and punctures in service, improving the bond between the tire tread and the casing, especially at high speeds, and increasing the rigidity of the tire in the transverse direction and thus reducing the deformation of the tire under load and consequent wear.

Such laminated assamblies generally include an even number of cabled fabric plies, wherein the adjacent twisted strands are oriented to extend in symmetrical directions with respect to the midplane or equator of the tire. Such an arrangement, however, has certain drawbacks in that such a tire tread is prone to punctures and tends to deform on contact with the ground surface. It has been attempted to overcome this by reinforcing the laminate with wire cables which are less susceptible to punctures but it has been found that deformation and resulting wear are not thereby decreased. Moreover, in such arrangements using a number of separate and distinct cabled plies, lines of shear tend to occur along the edges as a result of distortion.

It is an object of this invention to provide an improved pneumatic tire construction, and specifically to provide an improved reinforcing ply assembly or lamination in the top or tire tread area of a tire casing, which will present high lateral rigidity against distortion, high protective capacity of the underlying casing material against puncture, and will be free of a tendency to shear along the edges of the lamination. Another object is to improve the shaping characteristics of the tire prior to vulcanization.

In accordance with the invention, such an assembly comprises at least one strip of rubber composition reinforced with twisted strands, which strip has its side portions folded or tucked in to provide a two-ply structure. Generally, the mating edges of the folded side portions are arranged in abutting relation along a line which may coincide with the center line of the tire tread or may be laterally displaced therefrom.

In accordance with a further feature of the invention used in conjunction with the feature just specified, there is applied in engagement with the folded strip just described, an insert layer substantially of equal width thereto and comprising a composition of high elasticity modulus, preferably a composition provided by incorporating therein filler material comprising textile and/or metallic fiber.

The metal fiber where used may have a length in the range from 1 to 50 millimeters and a diameter of from 0.1 to 0.5 millimeter. If textile fiber is used, short fiber is preferred, of from 1 to 20 millimeters for example, and of the usual diameter as produced in natural form (cotton fiber for example) or synthetic (rayon, nylon or the like).

Such a layer has the important advantage that it will be deformable prior to vulcanization similar to raw rubber. This contrasts with the behavior of an ordinary ply of the kind comprising rubber with reinforcing strands, since the deformation or flexibility of such a ply prior to curing will be much more drastically limited owing to the inherent stiffness of the reinforcement used. Thus, such a ply cannot be stretched or compressed at all in a direction parallel to the reinforcing strands or cables. These limitations greatly complicate the tire manufacturing process since the raw rubber tire blank must be shaped before it is cured in its final form.

It will readily be understood, on the other hand, that a layer of rubber composition reinforced with short and thin fibers according to the invention, will be substantially as flexible as raw rubber, being shapable in all directions without limitation. After vulcanization, the fibers become securely bonded to the rubber which thereupon assumes a strictly inextensible character.

In accordance with a preferred feature of the invention, the reinforcing fiber material is all oriented more or less in a common direction, which is generally transverse to the direction of the tire tread. A rubber layer reinforced with fiber having a common general direction will behave substantially as would a ply of conventional rubberized fabric in which the reinforcing strands or cables are disposed parallel to the orientation of the fiber. Whereas such a ply prior to vulcanization is completely inextensible parallel to the direction of the strands, an improved fiber-reinforced layer can stretch and can contract in the direction parallel to the fiber, thereby allowing free deformation of the tire casing during the shaping operation.

Because of the limitation of the deformability of the conventional reinforced plies, which correspondingly limits the deformability of the tire casing during the shaping process, it has usually been necessary heretofore to use no more than two different sets of cord or wire in two different directions. This has resulted in a final tire assembly which presents a high tendency to lateral distortion and wear in service, as previously mentioned. However, by combining a layer of fiber-reinforced rubber with a pair of plies of generally conventional, cord- or wire-reinforced plies in which the reinforcements lie parallel to two different directions, a structure is obtained which is readily deformable for shaping purposes during the tire manufacturing process, but which after vulcanization will possess high transverse rigidity.

By simultaneously providing, according to the invention, one or more folded plies and a high-modulus fiber-reinforced layer in the manner described herein, the impact strength and transverse rigidity of the assembly are both increased. The folded sides have the further advantage of preventing any tendency for separation of the rubber along the sides, and incipient shear.

The features and advantages of the invention will stand out clearly from the ensuing description of exemplary embodiments of the invention with reference to the accompanying drawings, wherein.

Figure 1:
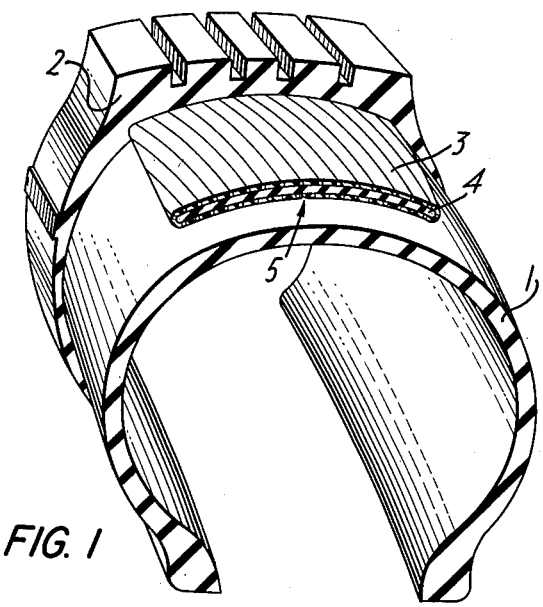
FIG. 1 shows in perspective, with parts removed, a section of tire constructed according to the invention.

The tire section shown in FIG. 1 comprises a conventional tire casing 1, a conventional tire tread 2 and an improved protective lamination 3 substantially equal in width to the width of the tread. The lamination comprises a rubber composition of the same general character as that used in the tire casing, having spaced wire cables or ropes imbedded therein in spaced parallel relation.

Shown at 4 is an insert layer having a high elasticity modulus obtained e.g. by incorporating textile and/or metal fiber in a rubber composition, as previously described. The ply 3 is folded or tucked in at its sides down and around the insert layer so that its opposite longitudinal edges 5 extend adjacent to each other along the midline of the tire. The wire of cord reinforcement of ply 3 may lie at a suitable angle, of from 10 to 50°, say 30°, to the midline of the tire. Hence it will be seen that in the under ply provided by the folded-down portions of the ply 3, the reinforcement lies at the same angle but in an opposite direction. Thus the desired angular relationship between the adjacent plies in the two-ply structure is obtained according to the invention in a very simple way.

Figure 2:
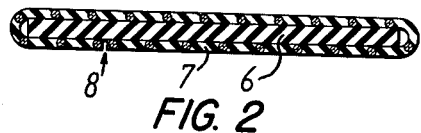
FIGS. 2, 3, 4 and 5 are cross sectional views of a protective assembly according to the invention in modified forms.
Figure 3:
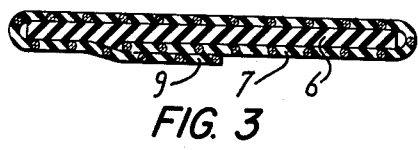
Figure 4:
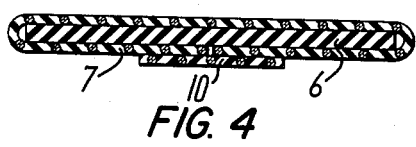

In each of FIGS. 2, 3 and 4, reference 6 designates the high-modulus insert layer and 7 designates the folded-down ply of wire-reinforced fabric. In FIG. 2, the joining line 8 between the edges of the folded down parts of ply 7 is displaced laterally from the center line line of the tire. In FIG. 3, the two folds of ply 7 overlap, as at 9. In FIG. 4 the folds are joined in abutting relation, as in FIGS. 1 and 2, but there is provided an additional reinforcing strip 10 bridging the joint. The narrow strip 10 may be similar in nature to the main ply 6. It will be understood that in each of FIGS. 3 and 4 the joint between the folds may either extend along the midline or may be displaced to one side from the midline.

Figure 5:

FIG. 5 differs from the embodiments so far described in that the layer of fiber-reinforced composition, here designated 11, is disposed under the folded-down parts of the ply 12 instead of being inserted between the main part and the folded parts of said ply. In this way the layer 11 simultaneously serves to maintain and reinforce the joint between the folds.

Instead of a single folded ply as shown in the embodiments so far discussed, two or more can be used, to provide four or more layers of wire or cord-reinforced rubber, combined with one or more fiber-reinforced layers of the type specified above. In all such arrangements, the lines of joint between the folded-down portions of the main plies are preferably displaced laterally from each other.

Figure 6:
FIGS. 6 to 10 are similar views relating to further modifications including a greater number of plies.

In FIG. 6 there are two plies 14 and 15 of cord-reinforced rubber which are both folded together around the sides of a common fiber-reinforced insert layer 16. The two junction lines are shown at 14 and 15 as being displaced transversely from each other.

Figure 7:
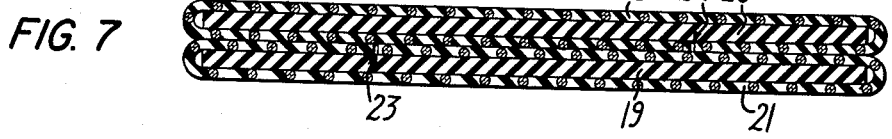

FIG. 7 shows two assemblies each similar to that of FIG. 2, in superimposed relation, with the two cord-reinforced plies 21 and 22 each tucked in around a related fiber-reinforced insert layer 19 and 20. In each of these insert layers the common general direction of the fibers is generally transverse, say in the range of from 75° to 90°, to the midline of the tire tread. In the plies 21 and 22 the reinforcing strands may form an angle of from 0 to 40° to said midline, and extend in opposite directions as between the two plies. The junction lines 23 and 24 in the plies 21 and 22 are displaced.

Figure 8:
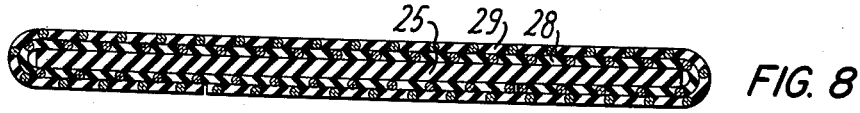
Figure 9:

In FIGS. 8 and 9, there are two superimposed strand-reinforced plies, respectively 28—29, and 30—31, as in FIG. 6. In FIG. 8, the double ply surrounds a single insert layer of fiber-reinforced rubber 25, whereas in FIG. 9 there are two such insert layers 26 and 27. In both these arrangements, the fiber reinforcements in the insert layers may extend generally transverse to the midline of the tire tread, e.g. at an angle of from 75° to 90° to the midline. In the double-insert arrangement of FIG. 9, in case the direction of the fiber in each insert layer is not strictly normal to the midline, said angles are preferably opposite, i.e. the fibers are symmetrical with respect to the midline. The reinforcements in the plies 28—29, and 30—31, may form angles of from 0 to 40° to the midline, i.e. they are generally longitudinal in extent. Again, where they are not strictly longitudinal, the arrangement is symmetrical with respect to the midline as between the outer ply and the inner ply.

Figure 10:
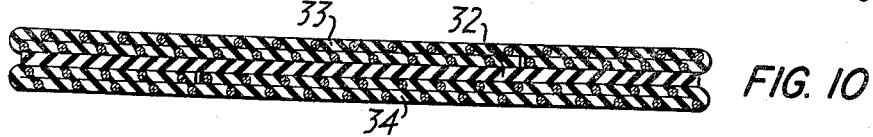

In FIG. 10 there are two wire- or cord-reinforced plies 33 and 34 each folded back upon itself, and each arranged entirely to one side of a single insert ply 32. The angular relationships of the reinforcements may be similar to those described above.

The protective laminations or assemblies described may be applied directly over the tire casing and conform to the outer curvature thereof. Alternatively, annular beads of rubber may be formed around the tire periphery at positions corresponding to the transverse ends of the assembly, whereby the protective assemblies can be made to assume a transverse curvature less than that of the tire casing periphery, and they may even be made flat in the transverse direction if desired.

In the specification and claims, it should be understood that the expressions "rubber" and "rubber composition" may designate both natural and synthetic rubber-like elastomer compositions. The term "strands" is used in the claims to describe any flexible or rigid reinforcing element extending unbrokenly for a substantial length through the ply which it serves to reinforce, and not generally less than 1 millimeter in diameter. Such strands may comprise twisted cord made from natural or synthetic textile fiber, or wire. In contrast to such strands, the word "fiber" is used with its usual connotation of relatively short small-diameter elements of natural or synthetic material, or thin metal wire, not more than 0.5 millimeter in diameter, incorporated in more or less random relation within the layer they serve to reinforce.

What I claim is:

1. A tire comprising a tire casing, a tire tread surrounding the outer periphery of said casing, and a protective laminate assembly extending circumferentially around said casing between it and said tread, said assembly comprising at least one strip of rubber composition having parallel spaced reinforcing strands incorporated therein and extending at an angle of about 10° to about 50° with respect to the midline of the tire carcass, said strip having side portions thereof folded laterally inwards into substantially mating engagement to define a two-ply structure having radially inner and outer faces, and a layer of rubber composition having reinforcing fibre incorporated therein, said fibre extending substantially transversely of the strip, said layer having radially inner and outer faces with at least one of its faces in engagement with a face of said structure.

2. A tire comprising a casing, a tread surrounding said casing, and a laminate assembly extending circumferentially around the tire between said casing and tread, said assembly comprising at least one layer of rubber composition having fibre reinforcement incorporated therein and at least one strip of rubber composition having parallel spaced reinforcing strands imbedded therein, said strip having a surface thereof applied against a radially outer surface of said layer and having side portions folded laterally inwards around the sides of said layer into substantially mating engagement on the radially inner surface of said layer so as substantially to surround said layer.

3. A tire as claimed in claim 1, wherein there are two strips arranged with their reinforcing strands extending at symmetrical angles with respect to a midline of each strip, said angles being from about 0° to about 40°.

4. A tire as claimed in claim 1, wherein there are two strips laminated together and surrounding at least one layer therebetween.

5. A tire as claimed in claim 1, wherein there are two strips each folded around a related fibre-reinforced layer with the folded portions of both strips in engagement.

6. A tire as claimed in claim 1, wherein there are two strips each folded in upon itself and arranged on opposite sides of at least one fibre-reinforced layer, with the folded side of one of the strips engaging one face of said layer and folded side of the other strip engaging the other face of said layer.

7. A tire as claimed in claim 1, wherein said folded side portions have their adjacent edges in substantially abutting relation.

8. A tire as claimed in claim 1, wherein said folded side portions have their mating edges in overlapping relation.

9. A tire comprising a tire casing, a tire tread surrounding the outer periphery of said casing and a protective laminate assembly extending circumferentially around said casing between it and the tread, said assembly comprising at least one strip of rubber composition having parallel spaced reinforcing strands incorporated therein and extending at an angle with respect to a midline of the tire carcass of about 0° to about 40°, said strip having its side portions folded laterally inwards to provide a two-ply structure substantially corresponding in transverse dimension to the transverse dimension of said tread, and a layer of rubber-composition having reinforcing fiber incorporated therein, said fiber extending substantially transversely of said strip, said layer having radially inner and outer faces with one of said faces engaging that face of said structure comprising said folded portions.

10. A tire as defined in claim 9, wherein said layer of rubber composition is disposed within said folded strip.

11. A tire as defined in claim 9, wherein said layer of rubber composition is disposed exteriorly of said folded strip.

12. A tire as defined in claim 10, wherein a second strip surrounds said first named folded strip.

13. A tire as defined in claim 10, further comprising a second folded strip and a second layer of rubber composition disposed within said folded strip.

14. A tire as defined in claim 9, wherein said layer engages said strip exteriorly along one of its faces, and a second strip having its side portions folded laterally inwards to provide a two-ply structure with said folded-in portions overlying the other face of said layer.

References Cited in the file of this patent

FOREIGN PATENTS

| | | |
|---|---|---|
| 25,485 | Great Britain | of 1902 |
| 700,435 | Great Britain | Dec. 2, 1953 |
| 1,126,838 | France | July 30, 1956 |